(12) United States Patent
Williams et al.

(10) Patent No.: US 10,523,322 B2
(45) Date of Patent: Dec. 31, 2019

(54) SYSTEMS AND METHODS FOR REMOVAL OF NONLINEAR DISTORTION FROM CHIRPING LASER SIGNALS

(71) Applicant: CABLE TELEVISION LABORATORIES, INC, Louisville, CO (US)

(72) Inventors: Thomas H. Williams, Longmont, CO (US); Luis Alberto Campos, Superior, CO (US); Zhensheng Jia, Superior, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 16/040,870

(22) Filed: Jul. 20, 2018

(65) Prior Publication Data

US 2019/0028199 A1    Jan. 24, 2019

Related U.S. Application Data

(60) Provisional application No. 62/534,994, filed on Jul. 20, 2017.

(51) Int. Cl.
| | |
|---|---|
| *H04B 10/2513* | (2013.01) |
| *H04B 10/69* | (2013.01) |
| *H04B 10/40* | (2013.01) |
| *H04B 10/60* | (2013.01) |
| *H04B 10/50* | (2013.01) |

(52) U.S. Cl.
CPC ....... *H04B 10/2513* (2013.01); *H04B 10/697* (2013.01); *H04B 10/6971* (2013.01); *H04B 10/6972* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 7,894,728 B1* | 2/2011 | Sun | H04B 10/60 398/208 |
| 2018/0034549 A1* | 2/2018 | Kikuchi | H04B 10/697 |

* cited by examiner

*Primary Examiner* — Darren E Wolf
(74) *Attorney, Agent, or Firm* — Armstrong Teasdale LLP (57) ABSTRACT

An optical signal receiver includes a processor, a memory, an input, an output, and a sampling unit in operable communication with the processor and the memory. The sampling unit includes a shift register and a clock, and is configured to receive a laser signal at the input, collect a first sample of the received input laser signal at a first time interval, determine an amplitude of the first sample, assign a first symbol of a plurality of symbols to the determined amplitude, insert the first symbol at a first insertion point within the shift register, and generate a delay value at the output based on a position of the first insertion point with respect to the output.

17 Claims, 5 Drawing Sheets

SYSTEMS AND METHODS FOR REMOVAL OF NONLINEAR DISTORTION FROM CHIRPING LASER SIGNALS

CROSS REFERENCE TO RELATED APPLICATIONS

This application claims the benefit of and priority to U.S. Provisional Patent Application Ser. No. 62/534,994, filed Jul. 20, 2017, the disclosure of which is herein incorporated by reference in its entirety.

BACKGROUND

The field of the disclosure relates generally to digital transmission systems, and more particularly, to wired, wireless, and optical digital transmission systems.

Conventional digital transmission systems typically include both linear and non-linear distortion. However, for the purposes of the following discussion, use of the term "distortion" is generally intended to refer to nonlinear distortion. Some digital transmission systems utilize lasers or semiconductor lasers for data transmission. Semiconductors lasers, however, are known to "chirp." A chirp refers to a change of the wavelength of a laser, typically caused by laser instability. Chirps can indicate an increase of a signal frequency over time, sometimes referred to as an "up-chirp," or a decrease, sometimes referred to as a "down-chirp." Thus, as the signal intensity increases, the wavelength changes accordingly.

That is, chirp often refers to the frequency shift of laser sources when the laser intensity is changed. In an optical system with chromatic dispersion, such frequency shifts may cause changes in propagation speed for different parts of an amplitude-modulated signal. Where the laser source includes a semiconductor laser diode, the refractive index of the semiconductor material changes based on the current passed through the material. Optical chirps are produced as the laser is modulated, and the current density changes accordingly. More specifically, nonlinear distortion is created when a chirping light signal is passed through a long fiber optic cable having chromatic dispersion. This nonlinear distortion causes inter-symbol interference (ISI), which will limit the maximum distance, the maximum current drive, and the maximum bandwidth of which the system is capable.

Some conventional transmission technology utilizes Data Over Cable Service Interface Specification (DOCSIS) or DOCSIS version 3.1 (DOCSIS 3.1) technology and orthogonal frequency division multiplexing (OFDM) and/or orthogonal frequency division multiple access (OFDMA) modulation. Conventional cable plants may include hundreds of transmitters operating in burst mode, and are configured to transmit OFDM and OFDMA signals through wired and wireless channels. Systems and methods for measuring nonlinear distortion are described in U.S. Pat. Nos. 9,209,863, 9,225,387, and 9,590,696, the disclosures of which are incorporated by reference herein.

Figure 1A:
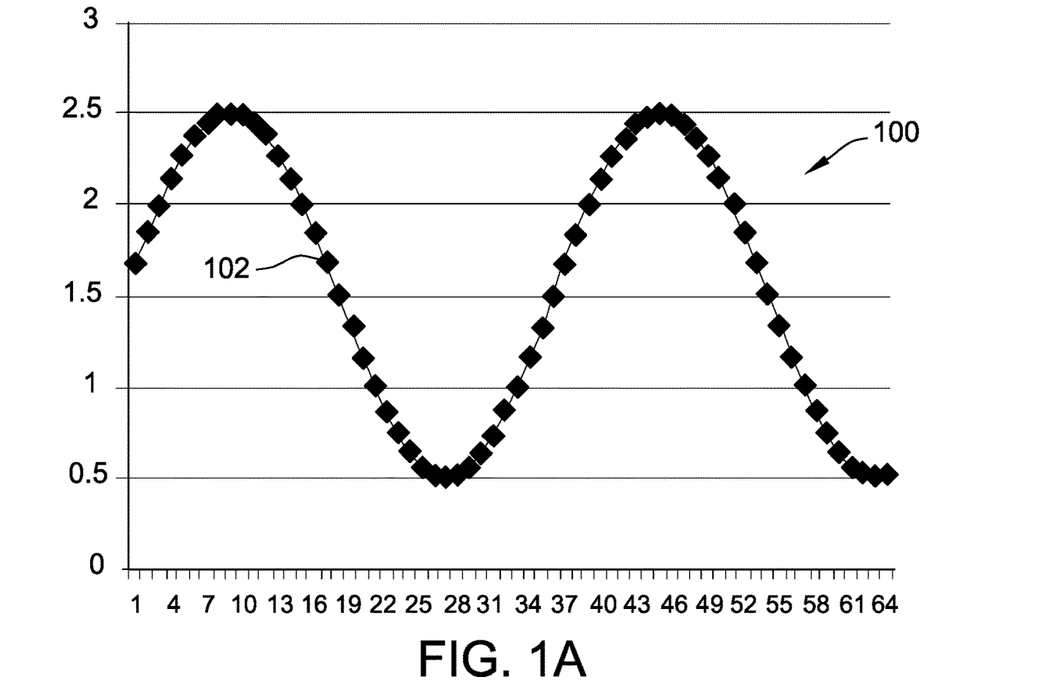
FIG. 1A is a graphical illustration depicting a conventional sampled signal.
Figure 1B:
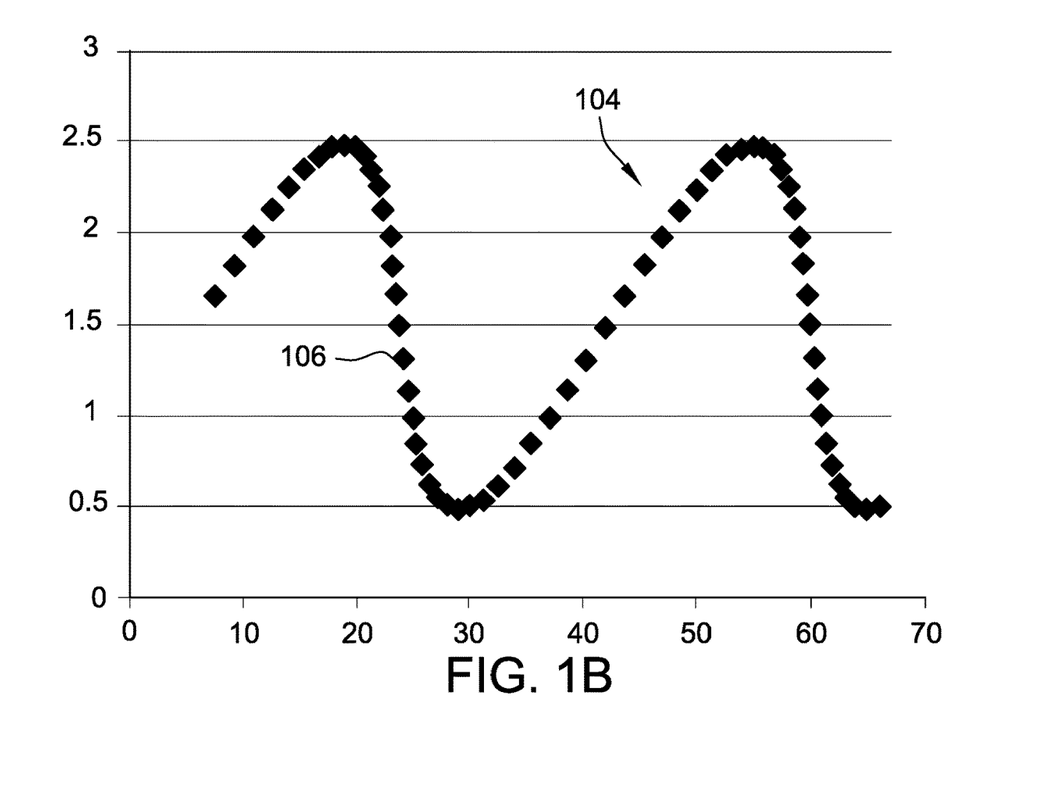
FIG. 1B is a graphical illustration depicting a conventional sampled signal, which illustrates an example of the sampled signal depicted in FIG. 1A, having chromatic dispersion and exhibiting a chirp.

FIG. 1A is a graphical illustration depicting a conventional sampled signal 100. Signal 100 diagrams a sine wave of a series 102 of individual amplitude samples over time. FIG. 1B is a graphical illustration depicting a conventional sampled signal 104, which is an example of sampled signal 100, FIG. 1A, having chromatic dispersion and exhibiting a chirp. More specifically, signal 104 illustrates an example of signal 100 after having been transmitted using a laser exhibiting an optical frequency that varies with current drive, and after having gone through a fiber optic cable that produces chromatic dispersion. Signal 104 similarly diagrams a sine wave of a series 106 of individual amplitude samples over time. As individual values of series 106 increase, a delay 108 also increases, thus further distorting the waveform of signal 104.

Accordingly, a comparison of signals 100 and 104 illustrates the effect of a chirp, plus chromatic dispersion, on a sine wave. The combination of chirp and chromatic dispersion adds nonlinear distortion. In single mode glass fiber, chromatic dispersion, which is similar to group delay from filters, results from different frequencies (optical wavelengths) traveling at different speeds down the fiber optic cable.

BRIEF SUMMARY

In an embodiment, an optical signal receiver includes a processor, a memory, an input, an output, and a sampling unit in operable communication with the processor and the memory. The sampling unit includes a shift register and a clock, and is configured to receive a laser signal at the input, collect a first sample of the received input laser signal at a first time interval, determine an amplitude of the first sample, assign a first symbol of a plurality of symbols to the determined amplitude, insert the first symbol at a first insertion point within the shift register, and generate a delay value at the output based on a position of the first insertion point with respect to the output.

In an embodiment, a sampling unit for an optical communication system includes an input, an output, and a shift register disposed between the input and the output. The shift register includes a plurality of insertion points located at varying functional distances between the input and the output. Sampling unit further includes a clock, and is configured to sample a laser signal at the input, determine an amplitude of the sampled laser signal, assign a symbol to the determined amplitude, insert the symbol at a one of the plurality of insertion points, and generate a delay value at the output based on the functional location of the one of the plurality of insertion points.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, mitigation and removal of non-linear distortion from a chirping laser signal may be performed according to several advantageous techniques. In one exemplary technique, a pre-distortion signal is introduced to counter the effect of distortion produced by chirp. In an exemplary embodiment, a sampling pre-distorter unit is configured to detect an amplitude of an input signal, and adjust the delay of each sample of the input signal based on the detected amplitude. In another embodiment, symbols are assigned according to an amplitude of an input signal, and the symbols are inserted into a shift register to define an amount of time until the next symbol is read.

In some embodiments, the distortion mitigation and removal techniques are implemented for signals transmitted according to DOCSIS specifications, and for signals implementing OFDM for downstream signals and OFDMA for upstream signals. OFDM and OFDMA are complimentary, and OFDM will more often be used in a downstream transmission where a transmitter (e.g., a Cable Modem Termination System (CMTS) sends information to one or more receivers (e.g., cable modems (CMs). In contrast, OFDMA would more typically be used in an upstream transmission, and in the case where multiple transmitters (e.g., CMs) transmit to the receiver (e.g., CMTS). In an exemplary embodiment, the distortion mitigation/removal techniques of the present embodiments are implemented at one or more receivers in a communications network.

Figures 2A, 2B, 2C:
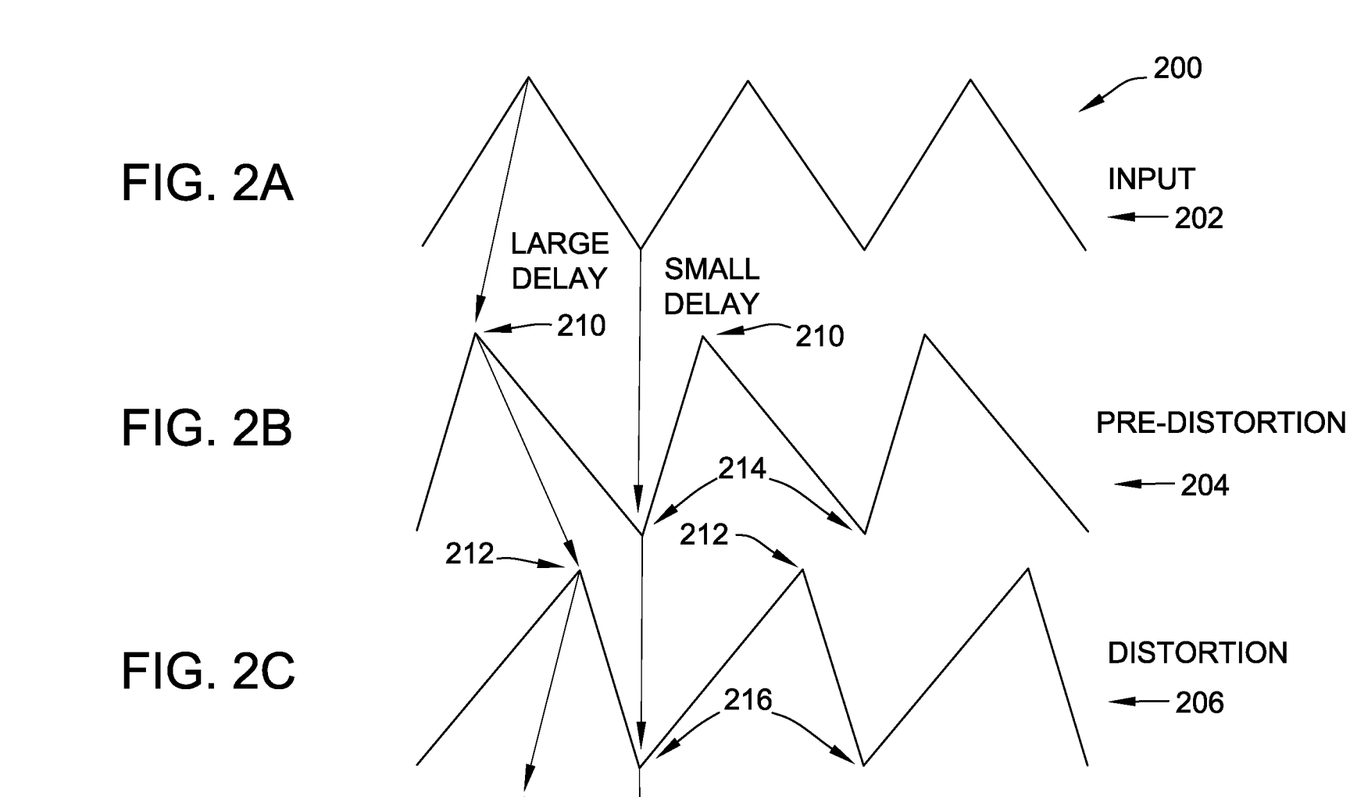
FIGS. 2A-D are graphical illustrations demonstrating an operational corrective scheme on respective signal waveforms, according to an embodiment.
Figure 2D:
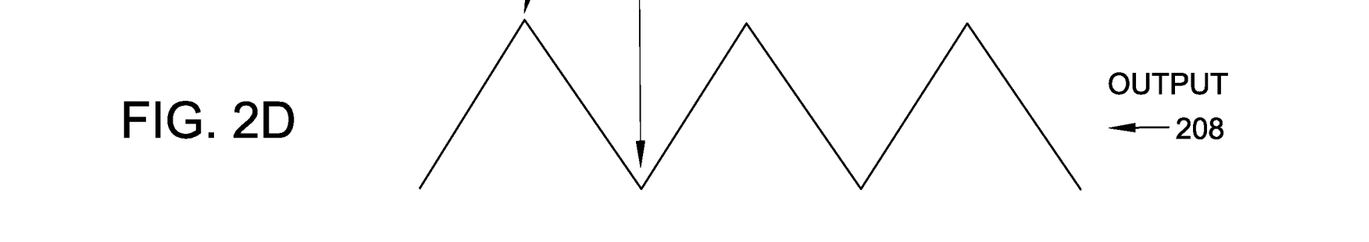

FIGS. 2A-D are graphical illustrations demonstrating an operational corrective scheme 200 on respective signal waveforms 202, 204, 206, and 208. More specifically, waveform 202, FIG. 2A, represents an input signal, similar to signal 100, FIG. 1A. Waveform 204, FIG. 2B, represents a pre-distortion signal, which may be added to input waveform 202, to correct for non-linear distortion. Waveform 206, FIG. 2C, represents a signal experiencing distortion, such as from chirp and chromatic dispersion, similar to signal 104, FIG. 1B. Waveform 208, FIG. 2D, represents an output signal that is a combination of distorted waveform 206 and pre-distortion waveform 204. As illustrated in the exemplary embodiment of FIG. 2D, output waveform 208 closely resembles the original signal of input waveform 202.

More particularly, corrective scheme 200 illustrates how pre-distortion correction operates to mitigate the effect of chirp and/or chromatic dispersion on a transmitted waveform, namely, where signals/signal samples at higher amplitudes experience delays greater than signals at lower amplitudes. As illustrated in FIG. 2B, in the exemplary embodiment, pre-distortion waveform 204 is constructed such that higher amplitude portions 210 of pre-distortion waveform 204 are sufficient to compensate for the greater delay experienced at corresponding high-amplitude portions 212 of distorted waveform 206. Similarly, pre-distortion waveform 204 may be further constructed such that lower amplitude portions 214 of pre-distortion waveform 204 are sufficient to compensate for the relatively small delay experienced at corresponding low-amplitude portions 216 of distorted waveform 206.

Figure 3:
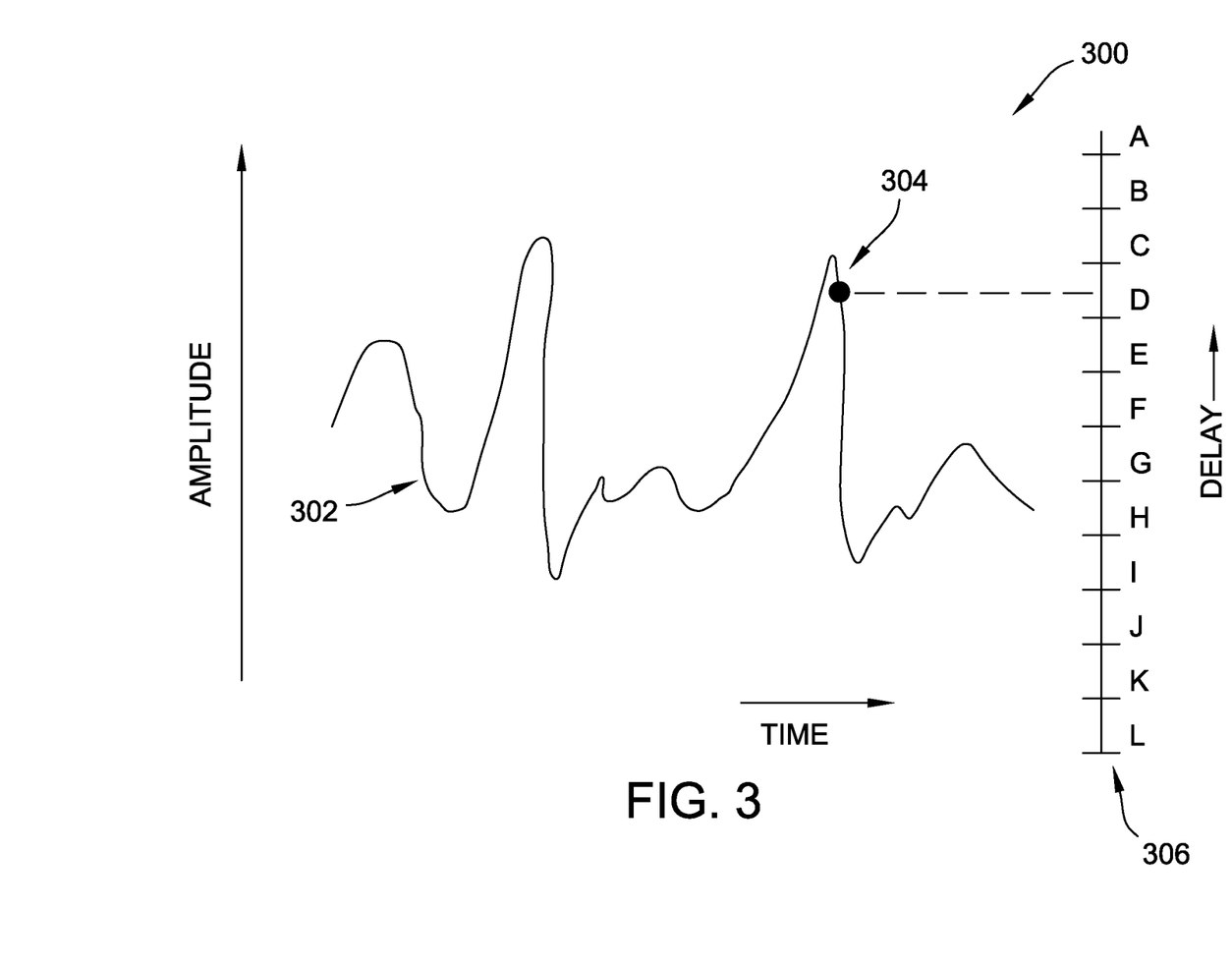
FIG. 3 is a graphical illustration depicting a symbol assignment scheme for an input signal, according to an embodiment.

FIG. 3 is a graphical illustration depicting a symbol assignment scheme 300 for an input signal 302. In an exemplary embodiment, input signal 302 is sampled over time by its amplitude (e.g., voltage), and the amplitude at a particular time sample 304 is assigned a symbol 306 corresponding to the particular amplitude level detected (e.g., symbol "D" as illustrated in FIG. 3). In the exemplary embodiment, higher amplitude samples 304 of input signal 302 are assigned to symbols 306 that correspond to relatively shorter delay values inserted into the shift registers depicted in FIGS. 4 and 5, below. In some embodiments, the delay values of symbols 306 are relatively linear with respect to the amplitude of samples 304 of signal 302. In other embodiments, the delay values are not linear in accordance with amplitude.

Figure 4:
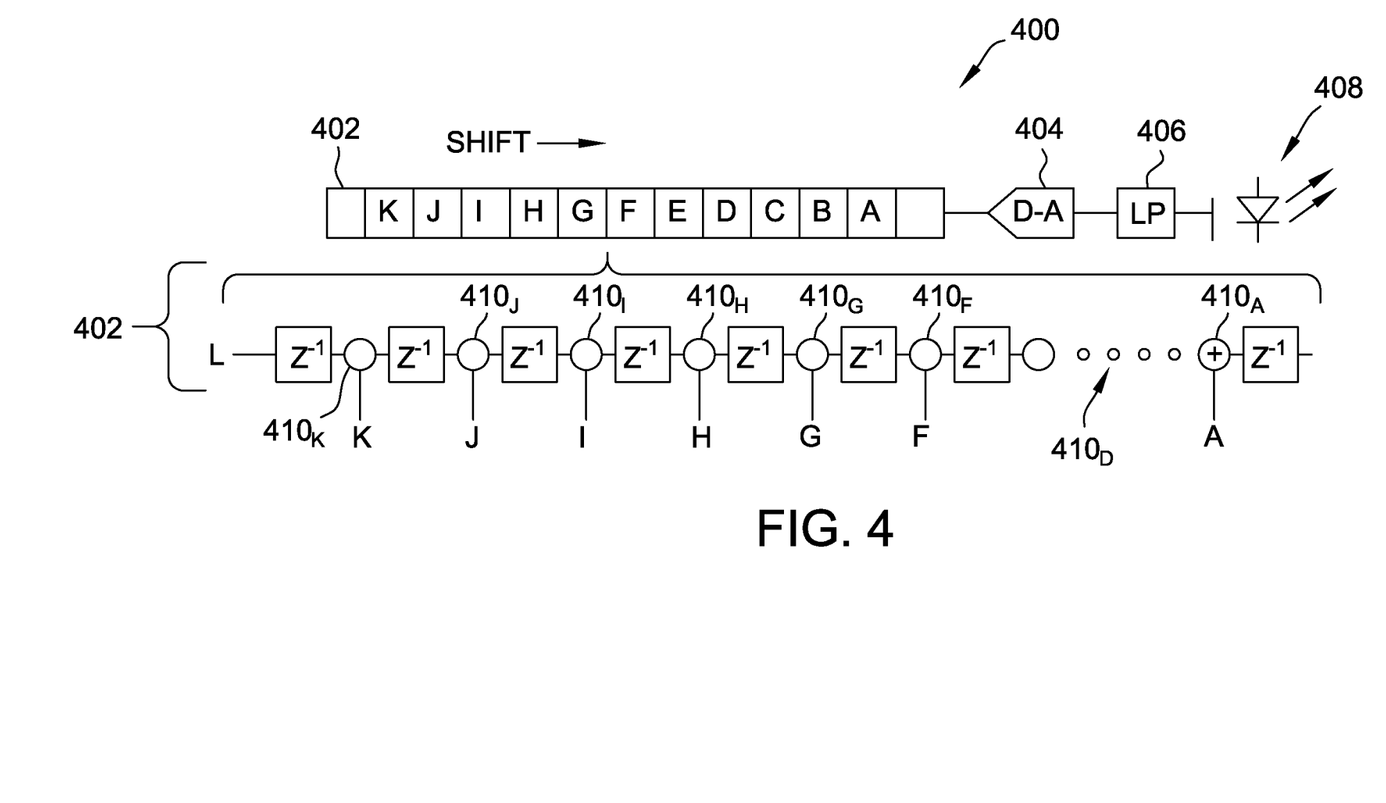
FIG. 4 is a schematic illustration depicting a periodic sampling pre-distortion unit for implementing the symbol assignment scheme depicted in FIG. 3, according to an embodiment.

FIG. 4 is a schematic illustration depicting a periodic sampling pre-distortion unit 400 for implementing symbol assignment scheme 300, FIG. 3. In the exemplary embodiment, sampling pre-distortion unit 400 includes a shift register 402, and one or more of a digital-to-analog (D-A) converter 404 and a lowpass filter 406. In at least one embodiment, sampling pre-distortion unit 400 is a component of a receiver (not shown) configured to receive a wavelength signal from a fiber optic cable (not shown) utilizing a semiconductor laser 408. In the exemplary embodiment, shift register 402 is a periodic-clock shift register, and the conversion rate of D-A converter 404 is also periodic. Laser 408 may be, for example, a distributed feedback (DFB) laser, a laser diode, or an optical fiber laser.

Operation of unit 400 is described in accordance with scheme 300, FIG. 3. In the exemplary embodiment, higher amplitude samples 304 of input signal 302 are inserted at various insertion points 410 of shift register 402 according to the symbol 306 assigned to the particular sample 304. That is, sampling pre-distortion unit 400 detects the amplitude of sample 304 of input signal 302, and assigns thereto one of symbols 306 corresponding to the detected amplitude. The assigned symbol 306 thus represents a discrete delay value that may be assigned to the particular detected sample 304 based on its amplitude. The delay value is accomplished using shift register 402, by inserting the particular sample 304 into shift register 402 at the particular insertion point 410 that corresponds to the assigned symbol 306 of the particular sample 304 (insertion point $410_D$ in the example illustrated in FIG. 3).

In the exemplary embodiment, sampling pre-distortion unit 400 is configured to detect or measure each voltage sample 304 of input signal 302, and then quantify the detected voltage sample 304 by its amplitude. The digital value of sample 304 may then be added to shift register 402 at the particular insertion point 410 based on the sampled amplitude. According to these exemplary techniques, the pre-distortion delay value may be controlled according to the measured amplitude, as illustrated with respect to FIGS. 2B-C. In this periodic-shift embodiment, other shift registers may be assigned a zero value.

In further operation of sampling pre-distortion unit 400, the pre-distorted signal output from periodic-clock shift register 402 will have a digital value that may be periodically D-A converted (e.g., by D-A converter 404), low-pass filtered (e.g., by lowpass filter 406), and applied to laser 408. In an exemplary embodiment, pre-distortion unit 400 may be further configured to implement greater or lower delay values depending on the frequency, the distance, in addition to the amplitude-based delay values described immediately above. That is, a particular input transmission signal may receive more or less pre-distortion according to the distance of the receiver in which unit 400 may be disposed from a transmitter (not shown), as well as the chromatic dispersion of the fiber optic cable (also not shown) therebetween.

Figure 5:
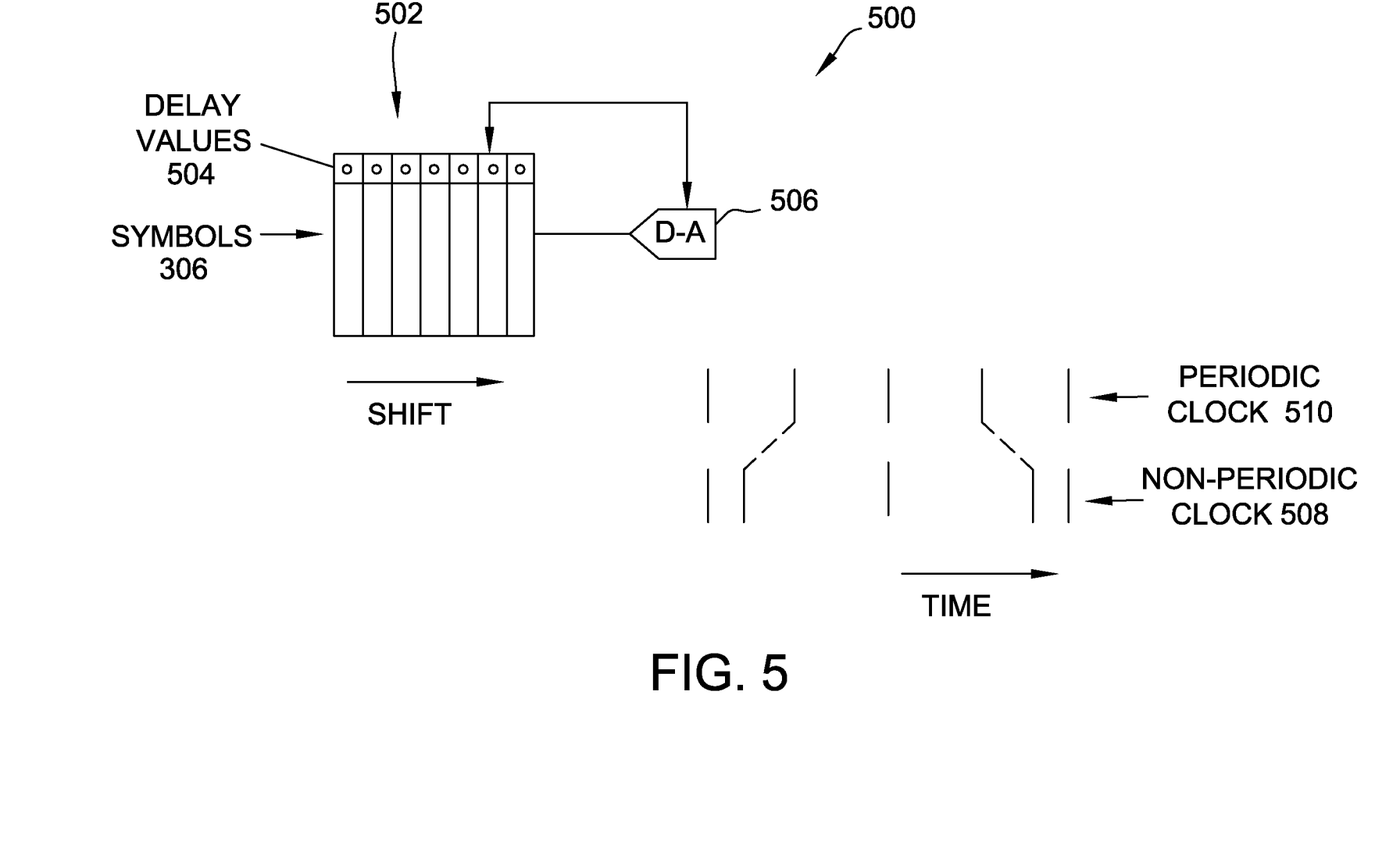
FIG. 5 is a schematic illustration depicting a non-periodic sampling pre-distortion unit for implementing the symbol assignment scheme depicted in FIG. 3, according to an alternative embodiment.

FIG. 5 is a schematic illustration depicting a non-periodic sampling pre-distortion unit 500 for implementing symbol assignment scheme 300, FIG. 3. Pre-distortion unit 500 is similar to pre-distortion unit 400, FIG. 4, in several structural aspects, and therefore not all structural elements are repeated in the example illustrated in FIG. 5. Pre-distortion unit 500 is different though, from pre-distortion unit 400, and that unit 500 is configured to implement a non-periodic shift register 502. In the exemplary embodiment, non-periodic shift register 502 is formed with both symbols 306 and the respective corresponding delay values 504 that are desired for each symbol 306.

In exemplary operation of pre-distortion unit 500, a particular delay value 504 may be read from shift register 502 and used to determine the number of clock ticks of shift register 502 until a D-A converter 506 converts the next symbol 306. Accordingly, the average number of conversions of pre-distortion unit 500 remains relatively steady with respect to the number of conversions performed by pre-distortion unit 400, however, in pre-distortion unit 500 a non-periodic clock 508 has a clock rate that is non-periodic and particularly in comparison with a periodic clock 510, such as may be implemented with respect to all pre-distortion unit 400.

According to the embodiment illustrated in FIG. 5, the non-periodic clock ticks trigger the D-A conversions (e.g., by D-A converter 506), which include variable delays depending on the value of the particular symbol 306 being converted. In the exemplary embodiment, D-A converter 506 drives a low-pass filter (e.g., lowpass filter 406, FIG. 4, not shown in FIG. 5), which drives a laser (e.g., laser 408, FIG. 4, also not shown in FIG. 5).

In each of the embodiments described above, the novel and advantageous techniques may be implemented by a processor programmed to execute a training process for the pre-distortion. In some embodiments, the programmed training process may begin as a relatively basic measure-and-output technique, and become more complex over time as the system learns the particular frequencies, distances, dispersions, and average chirps over the particular fiber optic cable and respective transmitters. In some embodiments, the learning process increases amplitude and/or maximum frequency as the solution improves over time.

The present techniques are described herein with respect to waveforms that necessarily move forward in time. That is, in the case where distortion causes portions of the waveform to move "backward" in time (i.e., the descending downward slope of a crest on an input signal moving from right to left), the present pre-distortion embodiments will not be as practical to implement.

In an exemplary embodiment, a linear equalizer is utilized in addition to the nonlinear correction systems and methods described above. In at least one embodiment, a look-up table is utilized (e.g., in a memory configured to be in operable communication with a processor that executes the present correction techniques), to simplify delay calculations. Additionally, nonlinear correction may be performed at the receiver. In some cases, the symbols are oversampled, and the symbol timing may be changed (e.g., by the processor) before a stream of periodic symbols (e.g., symbols 306) are produced for use with a shift register.

The embodiments herein are also of its particular use in the case where the amplitude at high frequencies is too great to effectively employ pre-distortion. In such instances, the amplitude of the input signal may be reduced, thereby resulting in a degraded signal-to-noise ratio (SNR) at the receiver, in a manner similar to FM radio. That is, the processor of the system is configured to implement a pre-emphasis/de-emphasis process on the signal such that the present distortion mitigation techniques may be effectively deployed.

Systems and methods according to the present embodiments represent further significant improvements over conventional transmission schemes by providing dynamically adaptive distortion mitigation and removal techniques that learn over time, and adjust to measured powers, frequencies, and transmission distances.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An optical signal receiver, comprising:
a processor;
a memory;
an input and an output; and
a sampling unit in operable communication with the processor and the memory, the sampling unit including a shift register and a clock, a sampling unit configured to:
receive a laser signal at the input;
collect a first sample of the received input laser signal at a first time interval and a second sample of the received laser signal at a second time interval different from the first time interval;
assign (i) a first symbol of a plurality of symbols to a first amplitude of the first sample, and (ii) a second symbol of the plurality of symbols to a second amplitude of the second sample, wherein the first and second amplitudes are determined by the processor;
insert the first symbol at a first insertion point within the shift register and the second symbol at a second insertion point different from the first insertion point; and
generate a first delay value based on a position of the first insertion point with respect to the output and a second delay value based on a position of the second insertion point with respect to the output,
wherein the first sample has a greater amplitude than the second sample, and the generated first delay value is smaller than the generated second delay value,
wherein the processor is configured to incorporate the generated first and second delay values into an output laser signal at the output.

2. The receiver of claim 1, wherein the input and the output are communicatively coupled with a fiber optic cable.

3. The receiver of claim 2, wherein the sampling unit is further configured to sample a waveform of the received laser signal exhibiting at least one of (i) a chirp from a semiconductor laser source, and (ii) chromatic dispersion from the fiber optic cable.

4. The receiver of claim 3, wherein the semiconductor laser source is at least one of a distributed feedback laser, a laser diode, and an optical laser.

5. The receiver of claim 1, wherein the clock has a periodic clock rate.

6. The receiver of claim 1, wherein the clock has a non-periodic clock rate.

7. The receiver of claim 6, wherein the shift register includes the plurality of symbols and a plurality of delay values respectively corresponding to the plurality of symbols.

8. The receiver of claim 7, wherein the plurality of symbols and the plurality of delay values are stored within the memory.

9. The receiver of claim 8, wherein the processor is configured to retrieve the first symbol and a corresponding one of the plurality of delay values from a lookup table within the memory.

10. The receiver of claim 1, further comprising a digital-to-analog converter in operable communication with the output, and configured to convert the generated delay values into a digital signal.

11. The receiver of claim 10, further comprising a low pass filter in operable communication with the digital-to-analog converter.

12. The receiver of claim 10, wherein the receiver is configured such that conversion by the digital-to-analog converter is driven by a number of ticks by the clock.

13. The receiver of claim 1, wherein the plurality of symbols are distributed linearly with respect to an amplitude scale of the received laser signal.

14. The receiver of claim 1, wherein the plurality of symbols are distributed non-linearly with respect to an amplitude scale of the received laser signal.

15. The receiver of claim 1, wherein the generated delay value forms a portion of a pre-distortion waveform that is combined at the output by the processor.

16. The receiver of claim 1, wherein the second insertion point is functionally nearer to the output than the first insertion point.

17. A sampling unit for an optical communication system, comprising:

an input;

an output;

a shift register disposed between the input and the output, and including a plurality of insertion points located at varying functional distances between the input and the output; and a clock, wherein the sampling unit is configured to:

sample a laser signal, at the input, at a first time interval and a second time interval different than the first time interval;

assign a first symbol to an amplitude of the sampled laser signal at the first time interval and a second symbol to an amplitude of the sampled laser signal at the second time interval;

insert the first symbol at a first one of the plurality of insertion points and the second symbol at a second one of the plurality of insertion points; and generate a first delay value at the output based on the functional location of the first one of the plurality of insertion points a second delay value at the output based on the functional location of the second one of the plurality of insertion points, wherein the amplitude of the sampled laser signal at the first time interval is greater amplitude than the amplitude of the sampled laser signal at the second time interval, and wherein the first delay value is smaller than the second delay value.

* * * * *